United States Patent [19]
Baba et al.

[11] 4,304,462
[45] Dec. 8, 1981

[54] THERMAL HARDENED FIBER OPTIC CABLES

[75] Inventors: Anthony J. Baba, Gaithersburg; Stewart Share, Brookeville, both of Md.

[73] Assignee: The United States of America as represented by the Secretary of the Army, Washington, D.C.

[21] Appl. No.: 140,903

[22] Filed: Apr. 16, 1980

[51] Int. Cl.³ .................................................. G02B 5/14
[52] U.S. Cl. ..................................................... 350/96.23
[58] Field of Search ......................... 350/96.23, 96.34; 174/110 PM, 110 FC

[56] References Cited

U.S. PATENT DOCUMENTS 4,079,191  3/1978  Robertson et al. ...... 174/110 FC X
4,151,366  4/1979  Betts et al. ............... 174/110 PM X
4,243,299  1/1981  Gliemeroth et al. ............. 350/96.34

FOREIGN PATENT DOCUMENTS 2741153  3/1978  Fed. Rep. of Germany ... 350/96.23
2728633  1/1979  Fed. Rep. of Germany ... 350/96.23

OTHER PUBLICATIONS

"Fiber Optic Link for Cable Watchers", *Optical Spectra*, vol. 13, No. 8, Aug. 1979, pp. 35-36.

*Primary Examiner*—John D. Lee
*Attorney, Agent, or Firm*—Nathan Edelberg; Robert P. Gibson; Saul Elbaum

[57] ABSTRACT

Fiber optic cables suitable for use in nuclear radiation environments are disclosed which comprise a protective shield of low absorptance material which reflects thermal radiation. The shield is composed of layers of aluminum and Teflon.

3 Claims, 2 Drawing Figures

4,304,462

THERMAL HARDENED FIBER OPTIC CABLES

RIGHTS OF THE GOVERNMENT

The invention described herein may be manufactured, used, and licensed by or for the United States Government for governmental purposes without the payment to us of any royalty thereon.

BACKGROUND OF THE INVENTION

Fiber optic cables are being proposed for use by the military. These applications include long length communications systems, computer interconnects, data links for remote operations, and local distribution systems. Many of these applications will require the cables to function properly in nuclear radiation environments in which high levels of thermal radiation can be encountered. A considerable body of literature exists showing the deleterious effects of ionizing radiation on optical waveguides. However, little attention has been given to protecting the optical waveguides from the effects of thermal radiation pulses which accompany the ionizing radiation.

It is therefore an object of this invention to provide means to mitigate damage to optical fiber cables which occurs upon exposure of the cables to thermal radiation.

It is an object of this invention to provide such protective means for the cables which is relatively thin and lightweight, and which adds little to the cost of the cables.

SUMMARY OF THE INVENTION

The objects of the invention are accomplished by using relatively thin layers of low absorptance materials, such as white Teflon tape and aluminum foil or aluminized Mylar to reflect the thermal energy so that it cannot easily damage the cables. On cables which have opaque jackets, the material is wrapped around the outside of the jacket and a transparent Teflon sleeve may optionally be placed over the wrapping to protect it from abrasion. On cables with transparent Teflon jackets, the wrapping can be placed underneath the jacket. Because relatively thin layers of the reflecting material are used, there is not any significant increase in the cost, weight, or diameter of the protected cables.

DESCRIPTION OF THE PREFERRED EMBODIMENTS

Figure 1:
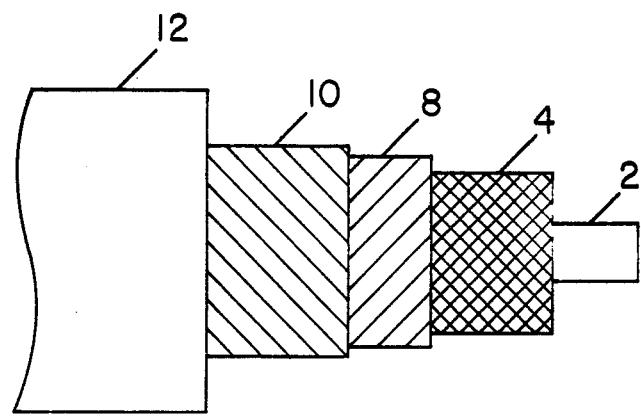
FIG. 1 illustrates a cable, which ordinarily has a transparent Teflon jacket, which is protected by the means of the present invention.

Fiber optic cables are seriously weakened when exposed to the thermal radiation produced by nuclear explosions. The thermal radiation causes the outer jacket of the cable to either melt, burn or disintegrate whereupon the strength members of the cables, ordinarily comprised of Kevlar or some such material, are exposed to the radiation. This causes the Kevlar to char and weaken. This disintegration of the outer jacket normally occurs at 25 to 30 cal/cm$^2$ for polyurethane or polyvinylchloride jackets, and at about 65 cal/cm$^2$ for flame retardant polyurethane or opaque fluorocarbon jackets. Even if the Kevlar remains unaffected, the destruction of the outer jacket can result in serious damage to the cable when it is subjected to mechanical stress. Such mechanical stress may be imposed in a normal field environment by the shockwave generated by the same nuclear event which produced the thermal radiation.

Fiber optic cables representing different construction techniques which are standard in the prior art were subjected to simulated nuclear thermal pulses to investigate their susceptibility. All types of strength members made of materials sold under the trademark Kevlar; the outer jacket material ranged from relatively low melting point materials, such as polyurethane and polyvinylchloride (PVC), to high melting point materials, such as materials sold under the trademarks Tefzel and Teflon. Table 1 lists the cables studied, their outer jacket materials, and the compositions of their inner layers.

The cables were exposed at a solar furnace through a rotating variable attenuator which produced thermal pulses. The characteristics of the attenuator are such that the pulse is nonsymmetrical; its intensity rises rapidly and then drops slowly. Its peak irradiance occurs at one-tenth the pulse width, by which time 25 percent of the energy has been emitted. Both the spectrum and pulse shape were good approximations of nuclear thermal pulses. Most cables were exposed to pulses of 5.5 seconds with the maximum irradiance occuring at 0.55 seconds. The maximum obtainable exposure was 85 cal/cm$^2$. Sample types that were damaged at this level were tested at successively lower irradiance levels until no damage, or at most superficial damage was noted. Samples that were not severely damaged were subject to longer pulses, up to 14 seconds, to a maximum exposure of 175 cal/cm$^2$.

Results of the thermal exposure of the commercially available cables are listed in table 2. After exposures of 27 to 32 cal/cm$^2$, large holes or voids appear in the PVC (cable H) and small holes appeared in some of the polyurethane jacketed cables (cables A, A', B). When the exposure level was increased, these voids increased in number and size. In some cables, these voids exposed the Kevlar underlayer and allowed it to become scorched and weakened. After being subjected to a thermal pulse, several of the polyurethane jacketed cables (cables A and A') were placed in tension with weights up to 180 kg. This load was their maximum design capability. Although they did not break unless their Kevlar was scorched, the outer jackets stretched more than the inner layers so that when the weights were removed, the larger contractions of the jackets caused the inner Kevlar layers either to unravel or to bulge at the voids in the jackets. The curvature of these bulges was quite sharp resulting in a high probability of optical fiber breakage. When the Kevlar was even only slightly scorched, it broke at 80 kg., a value which is at least 57 percent below its unirradiated strength. Since cables which would be subjected to a nuclear thermal pulse would also be subjected to blast effects, this type of damage must be avoided.

TABLE 1

| | CABLE DESCRIPTION | | |
|---|---|---|---|
| Type | Outer Jacket | Underlayers | Center |
| A | Black polyurethane 0.14 cm thick | White Teflon tape over Kevlar yarn | Black polyurethane over optic fibers |

TABLE 1-continued
CABLE DESCRIPTION

| Type | Outer Jacket | Underlayers | Center |
|---|---|---|---|
| A[1] | Black polyurethane 0.14 cm thick | Kevlar yarn | Black polyurethane over optic fibers |
| B | Black polyurethane 0.14 cm thick | White Teflon tape over optical fibers and polyester fiber | Kevlar braid over Kevlar yarn |
| C | Green polyurethane (flame retardant) | Kevlar yarn | Black polyurethane over optical fibers |
| D | Clear Tefzel | Kevlar yarn | Optical fiber inside fluorocarbon tube |
| E | Pink polyurethane (flame retardant) | Hytrel over Kevlar | Optical fiber |
| F | Blue Tefzel | Kevlar yarn | Optical fiber inside fluorocarbon tube |
| G | Clear PFA Teflon | Braided Kevlar | Optical fiber inside fluorocarbon tube |
| H | Dark grey PVC | Kevlar | Optical fiber inside polypropylene tube |

TABLE 2
THERMAL EFFECTS ON COMMERCIALLY AVAILABLE FIBER OPTIC CABLES

| Jacket material and thickness | Cable type | Exposure (cal/cm$^2$) | | | | | | | |
|---|---|---|---|---|---|---|---|---|---|
| | | 21 | 27 | 32 | 42 | 65 | 85 | 110 | 175 |
| | | 0.55 | 0.55 | 0.55 | 0.55 | 0.55 | 0.55 | 0.85 | 1.4 |
| Polyurethane 0.14 cm | A, A'&B | | 1 small hole in jacket | 2 small holes in jacket | 5 to 6 holes in jacket | 16 holes in jacket, Some Kevlar melting | Almost complete removal of jacket | Jacket ignition removal | |
| 0.14 cm | C | Jacket char and superficial surface cracks | | | Deepening of jacket cracks | | Jacket cracking down to Kevlar | | |
| 0.05 cm | E | Superficial char | | | | Heavy char | Kevlar exposure, char, shredding | | |
| Fluorocarbon 0.03 | D&G | | | | | No damage | Heavy char | Kevlar exposure, char | Kevlar shredding |
| 0.05 | F | | No damage | No damage | Jacket blistering | Kevlar exposure | Kevlar char | | |
| PVC 0.04 | H | Superficial char | Voids, Kevlar exposure | Kevlar char, shredding | Center polypropylene tube ignition | | | | |

For a 5.5 second pulse, the transparent polypropylene tube at the center of the PVC cables (cable H) ignited at 65 cal/cm$^2$. The polyurethane jackets on cables A, A' and B did not ignite at 85 cal/cm$^2$, which was the maximum available from the simulator with a pulse length of 5.5 seconds. They did ignite when exposed to 110 cal/cm$^2$ from an 8.5 second pulse. Also tested were cables C and E, which had flame retardant added to the polyurethane. Although these jackets charred and cracked, they did not ignite. At 42 cal/cm$^2$ cable E did not show any exposed Kevlar. Cable C did not show any exposed Kevlar for an exposure of 65 cal/cm$^2$. Exposed Kevlar was observed in these cables at 65 and 85 cal/cm$^2$, respectively. Cables D and G, which has clear Teflon of Tefzel jackets, were undamaged up through the 65 cal/cm$^2$ level, but charred at 85 cal/cm$^2$.

The blue colored Tefzel jackets (cable F) blistered at 42 cal/cm$^2$ and showed exposed Kevlar at 65 cal/cm$^2$.

Figure 2:
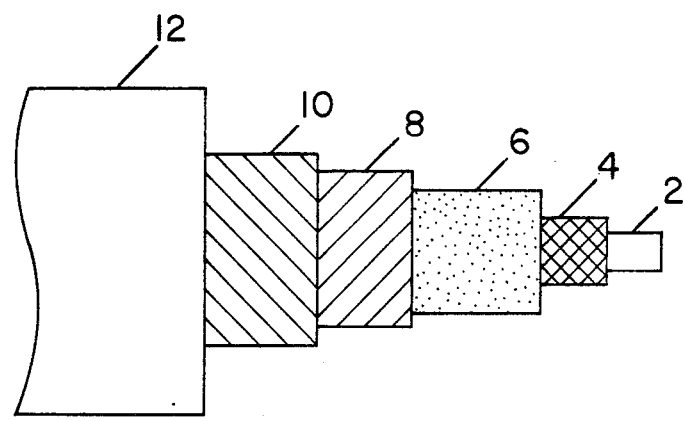
FIG. 2 illustrates a second embodiment of the invention comprising a fiber optic cable having an opaque jacket and the protective layers of the present invention.

The present invention achieves a significant amount of protection for the fiber optic cables by wrapping thin layers of low absorptance materials around the cables to reflect much of the thermal energy before it can overheat the cable. The materials found to afford the best protection comprises a combination of white Teflon over aluminum foil. Aluminized Mylar can be used in place of the aluminum foil but the latter has been found to afford greater protection for the cables. Optionally, an additional layer of white or clear Teflon may be applied over the protective layers to afford abrasion resistance to the cable. FIGS. 1 and 2 illustrate exemplary embodiments of the present invention.

FIG. 1 illustrates the manner in which the present invention may be applied to a fiber optic cable which normally comprises a transparent Teflon outerlayer. The cable normally comprises an optical fiber 2, a strength layer 4 comprising braided or wrapped strands of fiber such as Kevlar, and transparent outerlayer 12. In accordance with the present invention, layer 8 of aluminum foil or aluminized Mylar is provided adjacent the Kevlar strength layer 4, and layer 10, comprising white Teflon tape, is wrapped thereover. The outerlayer 12 of the fiber optic cable affords abrasion resistance for the heat protective shield 8,10.

FIG. 2 illustrates the manner in which the present invention may be applied to a fiber optic cable which normally comprises an opaque outer jacket. The cable normally comprises optical fiber 2, strength layer 4, and opaque jacket 6. Thermal protection is afforded to the cable by the layers 8 and 10, comprising aluminum foil or aluminized Mylar and white Teflon tape, respectively as described above. The optional transparent Teflon jacket 12 may be applied for abrasion resistance.

Cables modified as shown in FIGS. 1 and 2 exhibit a minimal increase in size, weight and cost. The increased protection afforded by the technique of the present invention provides for substantially greater utility of fiber optic cables in radiation environments. Cables modified in accordance with the present invention remain undamaged after exposure to thermal radiation of 120 to 180 cal/cm$^2$. This result is rather surprising in view of the fact that Teflon alone transmits sufficient energy to damage inside layers of test cables at exposure levels of only 85 cal/cm$^2$, while two layers of aluminum foil protected test cables against melting only to a level of 65 cal/cm$^2$. This indicates that considerable heat is conducted by the Teflon or the aluminum when either is used alone, yet a surprising amount of thermal radiation is repelled by the combined layers of the protective shield of the present invention.

While the invention has been described with reference to the accompanying drawings, we do not wish to be limited to the details disclosed therein as obvious modifications may be made by one of ordinary skill in the art.

We claim:

1. A fiber optic cable capable of withstanding a nuclear radiation environment comprising:
   at least one optical fiber;
   a strength layer adjacent to said optical fiber;
   a first thermal radiation reflecting layer, comprising aluminum foil, adjacent to said strength layer, to reflect incident thermal radiation from said nuclear radiation environment; and
   a second thermal reflecting layer, comprising a white fluoropolymer, adjacent to said first thermal reflecting layer, to reflect incident thermal radiation from said nuclear radiation environment.

2. A fiber optic cable, as recited in claim 1, wherein said first thermal radiation reflecting layer comprises an aluminized plastic film.

3. A fiber optic cable, as recited in claim 1 or 2, further comprising a layer of a transparent fluoropolymer adjacent to said layer of said second thermal reflecting layer.

* * * * *